W. E. Durkee,
Elevator.
N° 28,713.                                   Patented June 12, 1860.
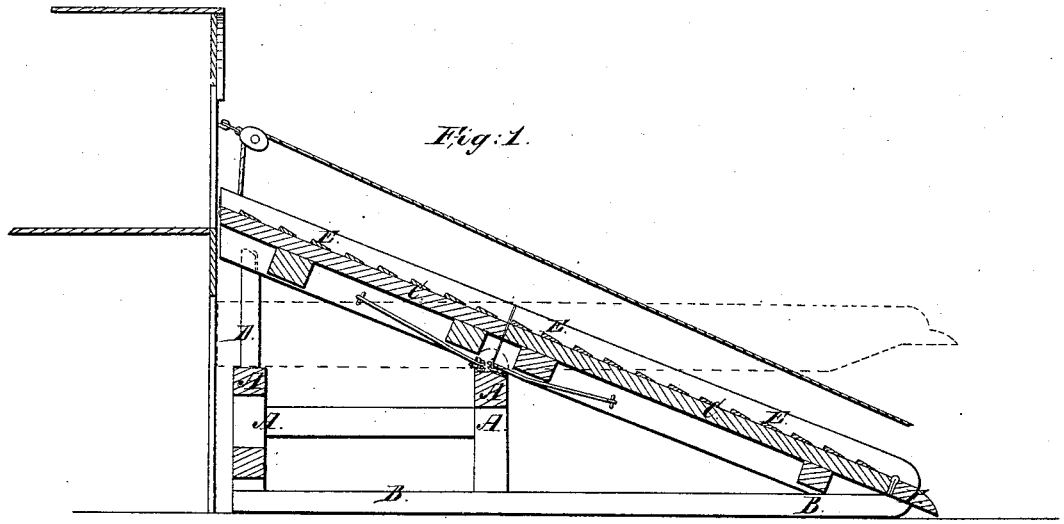
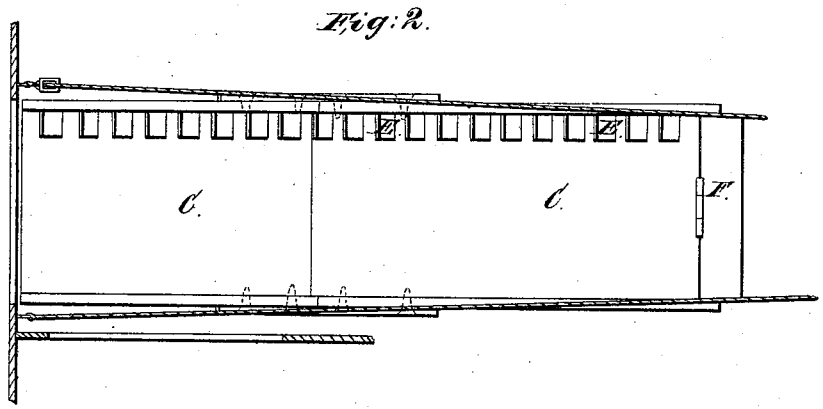
Witnesses:                                   Inventor:
B. Giroux                                    William E Durkee

UNITED STATES PATENT OFFICE.

WM. E. DURKEE, OF FORT EDWARD, NEW YORK, ASSIGNOR TO HIMSELF, A. S. WILLIAMS, AND JOS. H. HOPKINS, OF SAME PLACE.

HAY-ELEVATOR.

Specification of Letters Patent No. 28,713, dated June 12, 1860.

*To all whom it may concern:*

Be it known that I, WILLIAM E. DURKEE, of Fort Edward, in the county of Washington and State of New York, have invented a new and useful Hay and Grain Elevator; and I do hereby declare that the following is a full, clear, and exact description thereof, reference being had to the accompanying drawings, making a part of this specification, in which—

Figure 1, shows a longitudinal vertical section taken through the elevator, showing the same in a horizontal position in blue lines. Fig. 2, is a top-view of Fig. 1.

Similar letters of reference indicate corresponding parts in both figures.

The object of this invention is to afford a simple and cheap means, whereby wagons or carts loaded with hay or grain may be more easily and rapidly discharged either into cocks, or into barn windows.

To this end my invention consists in constructing an inclined frame-work that is braced together in a firm way and which is pointed to suitable supports in such a way that wagons or carts or any thing else loaded with hay or grain or even the loose hay itself may be drawn up the inclined plane and into a barn window or into stacks or barns in the field, by an arrangement of pulleys and ropes. The jointing of the inclined plane to the frame support will allow the plane to tip over to a horizontal plane, as will be hereinafter described, so that in case of wagons, they may have a steady support while they are elevated. The whole arrangement is to be set on the runners so that it may be dragged about the field from stack to stack in the operation of loading or unloading wagons with hay or grain.

To enable those skilled in the art to fully understand my invention, I will proceed to describe its construction and operation.

In the drawings A represents a rectangular frame-work that is supported on two parallel runners B, B. Both, frame and runners are made of good, strong and solid timber and put together, braced and staged in a strong and substantial manner. At the top and rear end of the frame A is jointed on inclined plane C one end of which is supported when not used for elevating wagons, by two upright pieces D, D, while the other end rests on the extreme ends of runners B, B, the incline is thus supported at its two ends and at its middle. It is to be made of a width, sufficient to allow a wagon to pass up it, and of a length, according to the height of the frame-work A. The incline should not be too steep for more power will be required to raise a wagon to its top than can be obtained by ordinary means.

E is a foot walk on one side of the inclined plane for a man to follow the hay up to the top.

F is a hinged board that is turned up out of the way in dragging the machine about from place to place.

Now in using this machine for elevating hay or grain in barns, the pieces D, D, are removed, the machine is dragged up to the side of the barn as represented in Fig. 2, in which the red lines indicate the barn. On each side of the barn-window, or loft window, should be secured a pulley, over which should pass a rope. The pulleys may be attached to the top of the inclined plane, which latter plan would be the best. This rope is then drawn down in the middle to the foot of the incline where it is to be attached to a wagon of hay or grain from which the horses have been detached. The horses are now hitched to the rope or ropes and they draw the wagon up the incline to its top, but when the wagon is over the frame A, the incline will tip up to a horizontal plane as indicated by blue lines Fig. 1 where the wagon will remain stationary until the load can be removed from it and put into the barn. In stacking hay the pieces D, D, are left under the end of the inclined plane and the hay, as it is raked up into cocks or windrows, is attached in a suitable manner to the rope that passes over pulleys which, in this case, must be attached to the machine and the hay is drawn up to the top of the floor and discharged at this end. In this manner barns may be easily filled from wagons with very little labor and expenditure of time, and hay may be stacked up to any desirable height without the laborious and slow work of pitching it up.

The machine for effecting these objects can be made by any ordinary workman and the material will always be at hand.

This machine can also be used with equal advantage for stacking or unloading grain into barns and in practice it will be used as much for one as for the other.

Having thus described my invention, what I claim as new, and desire to secure by Letters Patent is:—

The supporting frame A, the inclined plane C, jointed to the same, and the several parts combined therewith as described, for the purpose herein set forth.

WILLIAM E. DURKEE.

Witnesses:
C. HUGHES,
B. GIROUX.